(12) United States Patent
Rose et al.

(10) Patent No.: US 8,983,372 B2
(45) Date of Patent: Mar. 17, 2015

(54) WIRELESS COMMUNICATIONS SYSTEM PROVIDING MEDIA CONTENT TRANSFER FEATURES AND RELATED METHODS

(75) Inventors: Scott Douglas Rose, Waterloo (CA); Vahid Moosavi, Kitchener (CA); Sushil K. Verma, Richmond Hill (CA)

(73) Assignee: BlackBerry Limited, Waterloo, Ontario (CA)

( * ) Notice: Subject to any disclaimer, the term of this patent is extended or adjusted under 35 U.S.C. 154(b) by 606 days.

(21) Appl. No.: 13/036,427

(22) Filed: Feb. 28, 2011

(65) Prior Publication Data

US 2012/0220223 A1 Aug. 30, 2012

(51) Int. Cl.
*H04B 5/00* (2006.01)

(52) U.S. Cl.
USPC ........................................ 455/41.1; 455/41.2

(58) Field of Classification Search
USPC ......................................................... 455/41.1
See application file for complete search history.

(56) References Cited

U.S. PATENT DOCUMENTS

| | | | | |
|---|---|---|---|---|
| 2004/0117480 A1* | 6/2004 | Karaoguz et al. | ............. | 709/224 |
| 2006/0233519 A1* | 10/2006 | Narita | ............................. | 386/95 |
| 2008/0081558 A1* | 4/2008 | Dunko et al. | ................. | 455/41.1 |
| 2010/0054707 A1* | 3/2010 | Karaoguz et al. | ............... | 386/95 |
| 2010/0082136 A1* | 4/2010 | Rosenblatt et al. | ............. | 700/94 |
| 2013/0098986 A1* | 4/2013 | Kwon et al. | ................... | 235/375 |

FOREIGN PATENT DOCUMENTS

| | | | |
|---|---|---|---|
| CA | 2750359 | 8/2010 | |
| JP | 2008145972 | 6/2008 | ............. G10K 15/04 |
| WO | 2005109829 | 11/2005 | |
| WO | 2008042458 | 4/2008 | |

OTHER PUBLICATIONS

"Media Server" en.wikipedia.org/wiki/Media_server Printed Jan. 7, 2011.
"Logitech Squeezebox Touch" http://www.logitech.com/speakers-audio/wireless-music-systems/devices/5745 Printed Sep. 3, 2010.

* cited by examiner

*Primary Examiner* — David Bilodeau
(74) *Attorney, Agent, or Firm* — Allen, Dyer, Doppelt, Milbrath & Gilchrist, P.A.

(57) ABSTRACT

A wireless communications system may include a first electronic device comprising a first media content playback device, a first wireless transceiver, and a first controller coupled with the first media content playback device and the first wireless transceiver. The system may further include a second electronic device comprising a second media content playback device, a second wireless transceiver configured to wirelessly communicate with the first wireless transceiver, and a second controller coupled with the second media content playback device and the second wireless transceiver. The first controller may be configured to generate a playback pointer associated with playback of given media content, and wirelessly communicate the playback pointer to the second controller. The second controller may be configured to play back the given media content based upon the playback pointer, and without receiving the given media content from the first electronic device.

20 Claims, 6 Drawing Sheets

WIRELESS COMMUNICATIONS SYSTEM PROVIDING MEDIA CONTENT TRANSFER FEATURES AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a wireless communications system is disclosed herein which may include a first electronic device comprising a first media content playback device, a first wireless transceiver, and a first controller coupled with the first media content playback device and the first wireless transceiver. The system may further include a second electronic device comprising a second media content playback device, a second wireless transceiver configured to wirelessly communicate with the first wireless transceiver, and a second controller coupled with the second media content playback device and the second wireless transceiver. The first controller may be configured to generate a playback pointer associated with playback of given media content, and wirelessly communicate the playback pointer to the second controller. The second controller may be configured to play back the given media content based upon the playback pointer and without receiving the given media content from the first electronic device. Accordingly, this may advantageously conserve power or processing resources of the first electronic device by having the second electronic device continue playback of the given media content without streaming the content between the devices, for example.

More particularly, the first and second wireless transceivers may be configured to communicate with one another when in proximity with one another. By way of example, the first and second wireless transceivers may comprise near field communication (NFC) transceivers. Additionally, the playback pointer may comprise a media content identifier. In an example implementation, the second controller may be configured to obtain media content via a communications network and based upon a network address, and the playback pointer may further comprise a network address for the given media content.

The first controller may be further configured to discontinue playback of the given media content upon wirelessly communicating the playback pointer to the second controller, for example. By way of example, the first electronic device may comprise a mobile wireless communications device, and the second electronic device may comprise a media content server. In addition, the first and second controllers may be further configured to synchronize media content therebetween. By way of example, the given media content may comprise at least one of audio content or video content.

A related electronic device may include a media content playback device, a wireless transceiver configured to wirelessly communicate with a wireless communications device, and a controller coupled with the media content playback device and the wireless transceiver. The controller may be configured to receive a playback pointer from the wireless communications device via the wireless transceiver, where the playback pointer may be associated with playback of given media content by the wireless communications device. The controller may also be configured to play back the given media content with the media content playback device based upon the playback pointer, and without receiving the given media content from the wireless communications device.

A related wireless communications method may include generating a playback pointer at a first electronic device associated with playback of given media content with a first media content playback device of the first electronic device, and wirelessly communicating the playback pointer from the first electronic device to a second electronic device. The method may further include playing back the given media content with a second media content playback device of the second electronic device based upon the playback pointer and without receiving the given media content from the first electronic device.

A related non-transitory computer-readable medium is also provided. The computer-readable medium may have computer-executable instructions for causing an electronic device comprising a media content playback device and a wireless transceiver to perform steps comprising receiving a playback pointer from a wireless communications device via the wireless transceiver, where the playback pointer may be associated with playback of given media content by the wireless communications device, and playing back the given media content via the media content playback device based upon the playback pointer, and without receiving the given media content from the wireless communications device.

Figure 1:
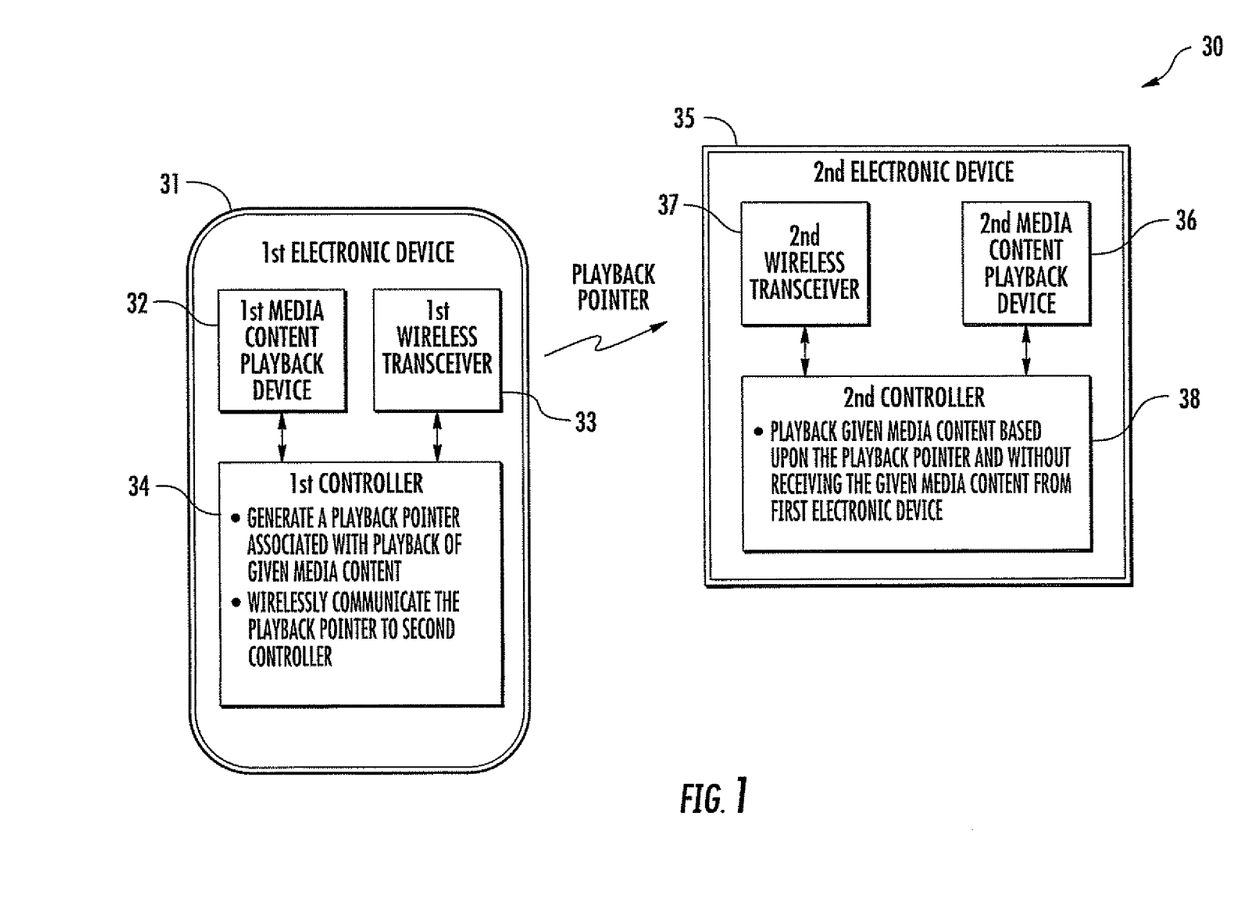
FIG. 1 is a schematic block diagram of a wireless communications system in accordance with an example embodiment.
Figure 5:
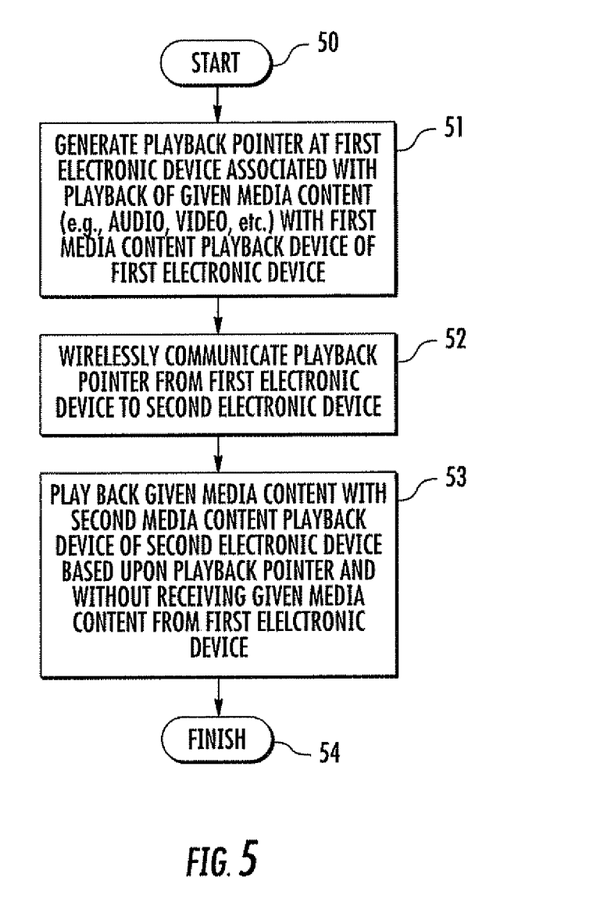
FIG. 5 is a flow diagram illustrating method aspects associated with the systems of FIGS. 1 through 4.

Referring initially to FIGS. 1 and 5, a wireless communications system 30 and related method aspects are first described. The system 30 illustratively includes a first electronic device 31 comprising a first media content playback device 32, a first wireless transceiver 33, and a first controller 34 coupled to the first media content playback device 32 and the first wireless transceiver 33. The system 30 further illustratively includes a second electronic device 35 comprising a second media content playback device 36, a second wireless transceiver 37 configured to wirelessly communicate with the first wireless transceiver 33, and a second controller 38 coupled to the second media content playback device 36 and the second wireless transceiver 37. The first controller 34 and the second controller 38 may be implemented using a combination of hardware (e.g., processor, memory, etc.) and software (e.g., a computer-readable medium having computer-executable instructions), for example.

Beginning at Block 50, the first controller 34 may be configured to generate a playback pointer associated with playback of given media content by the first media content playback device 32, at Block 51, as will be discussed further below. By way of example, the media content may comprise audio, video, text, etc., and the first and second media content playback devices 32, 36 may comprise audio playback devices (e.g., speakers, audio amplifiers, etc.), or video or image playback devices (e.g., displays, video amplifiers, etc.). In some example embodiments, a combination of media playback devices may be used, such as for multimedia content playback. Example types of media content may include music, video, animation, electronic books, podcasts, etc.

The first controller 34 is further configured to wirelessly communicate the playback pointer to the second controller 38, at Block 52, via the first and second wireless transceivers 33, 37. In the example embodiment of FIG. 2, the first and second wireless transceivers 33', 37' are configured to communicate when in proximity to one another. For example, the first and second wireless transceivers 33', 37' may comprise near field communication (NFC) transceivers.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

In this regard, NFC may be particularly advantageous for communicating a playback pointer between the first and second devices 31, 32, as the relatively close proximity used for such communications helps avoid conflicts or unwanted communication with others electronic devices. Moreover, because of the relatively close communication range, using NFC generally involves a gesture akin to physically pointing at the intended electronic device to which media content playback is to be transferred, which may be helpful in selecting a desired electronic device. However, it will be appreciated that other wireless communication formats may also be used in some embodiments for communicating or transferring the playback pointer, such as Bluetooth, wireless local area network (WLAN) or WiFi, etc.

The second controller 38 may advantageously be configured to play back the given media content based upon the playback pointer from the first electronic device 31, yet without receiving the given media content from the first electronic device, at Block 53, which illustratively concludes the method shown in FIG. 5 (Block 54). Accordingly, this may conserve power (e.g., battery) and processing resources of the first electronic device 31 by having the second electronic device 35 continue independent playback of the given media content.

Figure 2:
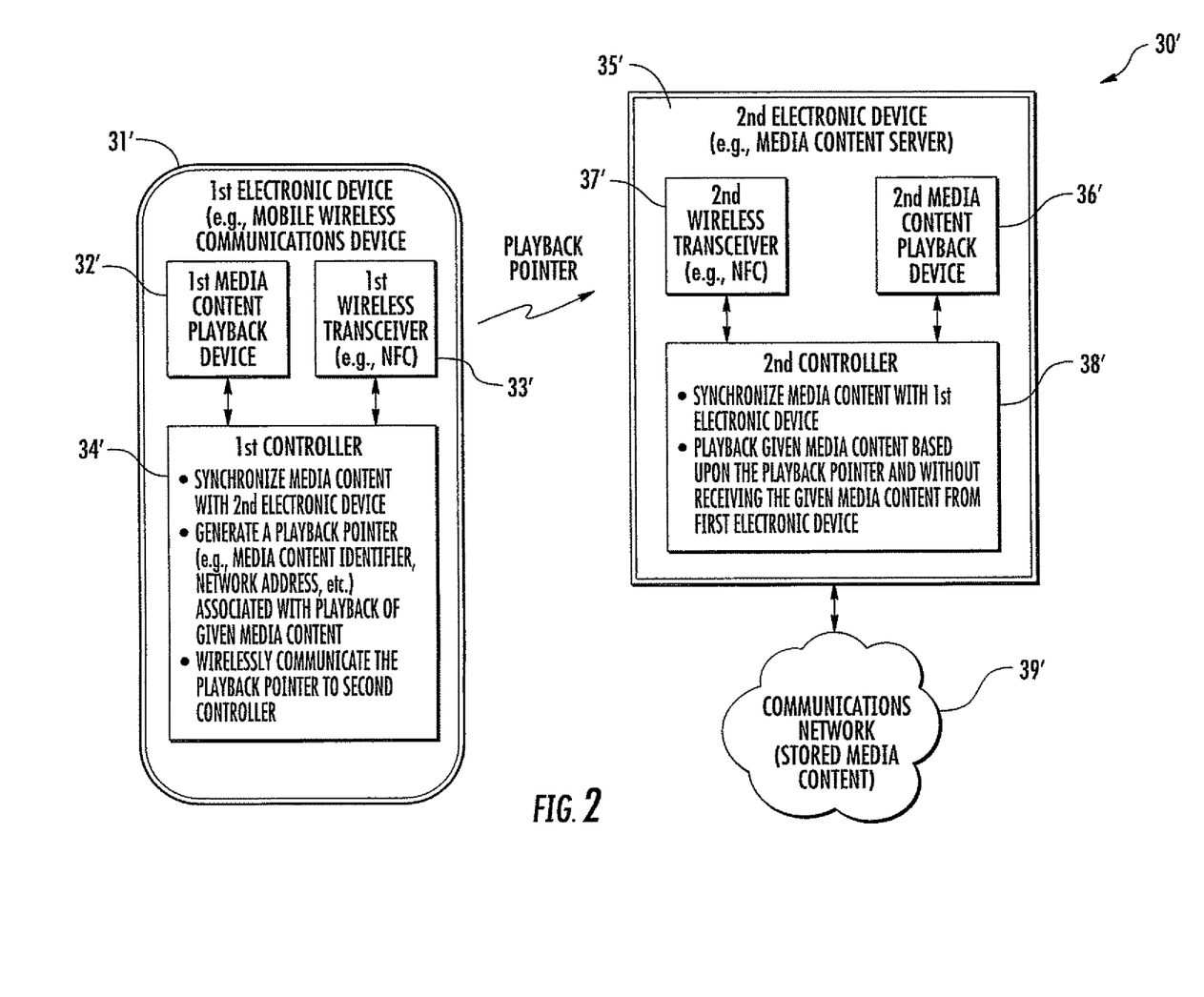
FIG. 2 is a schematic block diagram of an alternative embodiment of the wireless communications system of FIG. 1.

By way of contrast, in some systems music or video playback may be switched from a first device (e.g., a mobile phone or MP3 player) to a second device, such as a stereo or television, by wirelessly streaming the media playback from the first device to the second device using Bluetooth. That is, the first device continues to "play" the media and streams it to the second device, essentially acting as master device that commandeers the media output device of a slave device. However, one potential problem with such systems is that if the first device is moved around, the Bluetooth connection to the second device may become noisy or even get dropped. Moreover, this may impose significant power requirements on the first device, resulting in an increased battery drain, as well as increased usage of processing resources. These technical problems may advantageously be overcome by the systems 30, 30', as noted above.

Generally speaking, the playback pointer may include one or more pieces of information that allow the second controller 38 to play back the given media content without having to receive that content from the first electronic device 31. For example, the playback pointer may comprise a media content identifier, such as an identification number, title, etc., which allows the second controller 38 to identify the given media content from a library, catalog, or database of available media content. Turning again to the example implementation of FIG. 2, the second electronic device 35' may comprise a media content server, such as a media server application running on a personal computer (PC), Mac, etc.

It should be noted that playback may be of a single content item (e.g., a single song), or the given media content may comprise a plurality of content items (e.g., a plurality of songs in a playlist, a plurality of images in a slideshow or album, etc.). In some example embodiments, the first and second controllers 34', 38' may be further configured to synchronize media content therebetween (e.g., the second electronic device 35' may store a media content library, and the first electronic device 31' may be periodically synchronized to store at least some of the media content from the library).

Furthermore, in some example embodiments the second processor 38' may also be configured to obtain media content via a communications network 39' based upon a network address. As such, the playback pointer may comprise a network address for accessing the given media content via the communications network 39'. For example, the given media content may comprise an Internet radio stream, and the playback pointer may include an indicator of the network address where the radio stream may be accessed for continued playback by the second media content playback device 36'. Other examples may include television broadcasts (e.g., mobile TV), streaming videos (e.g., YouTube videos), streaming text (e.g., stock ticker, news feed), playlists, audio books, etc.

As noted above, a significant advantage of the above-described systems 30, 30' is that the first controller 34, 34' may advantageously be configured to discontinue playback of the given media content upon wirelessly communicating the playback pointer to the second controller, which advantageously helps conserve battery or processing resources of the first electronic device 31, for example. This sequence of events will be further understood with reference to another example communications system 60 shown in FIGS. 3 and 4. Here, the first electronic device comprises a mobile wireless communications device 61 (also referred to as a "mobile device" herein), and the second electronic device comprises an audio output device, which in the present example is a stereo receiver 65 (although other suitable audio output devices may also be used). The mobile device 61 further comprises a display 62, and the stereo receiver 65 similarly comprises a display 66. The stereo receiver 65 may include a memory for storing media content, may be coupled to a computer (such as in a home network) or other device which stores the media content, or it may access the media content via a network (e.g., Internet audio or video stream), as described above.

Figure 3:
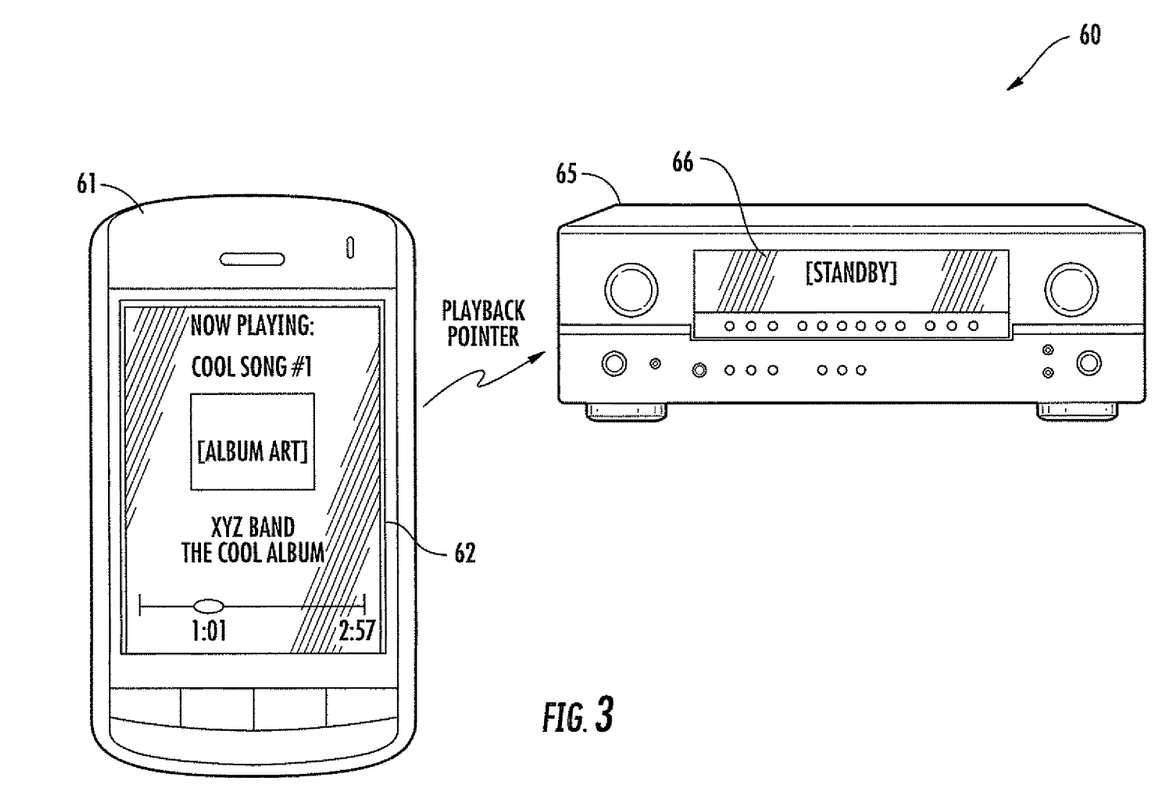
FIGS. 3 and 4 are schematic block diagrams of a wireless communications system in accordance with an example embodiment shown before and after transfer of a playback pointer, respectively.

As seen in FIG. 3, the mobile device 61 is playing a song (Cool Song #1 by the XYZ Band from the Cool Album) using a media application. At this moment, the song is 1:01 into playback, the stereo receiver 65 is in a standby mode, and wireless communication between the mobile device 61 and the stereo receiver 65 is initiated to communicate the playback pointer to the stereo receiver 65 and thereby "hand off" playback of the song from the mobile device to the stereo receiver 65. In the case of NFC, for example, wireless communication between the mobile device 61 and the stereo receiver 65 may be initiated by swiping or bumping the mobile device with the NFC-enabled stereo receiver.

Figure 4:
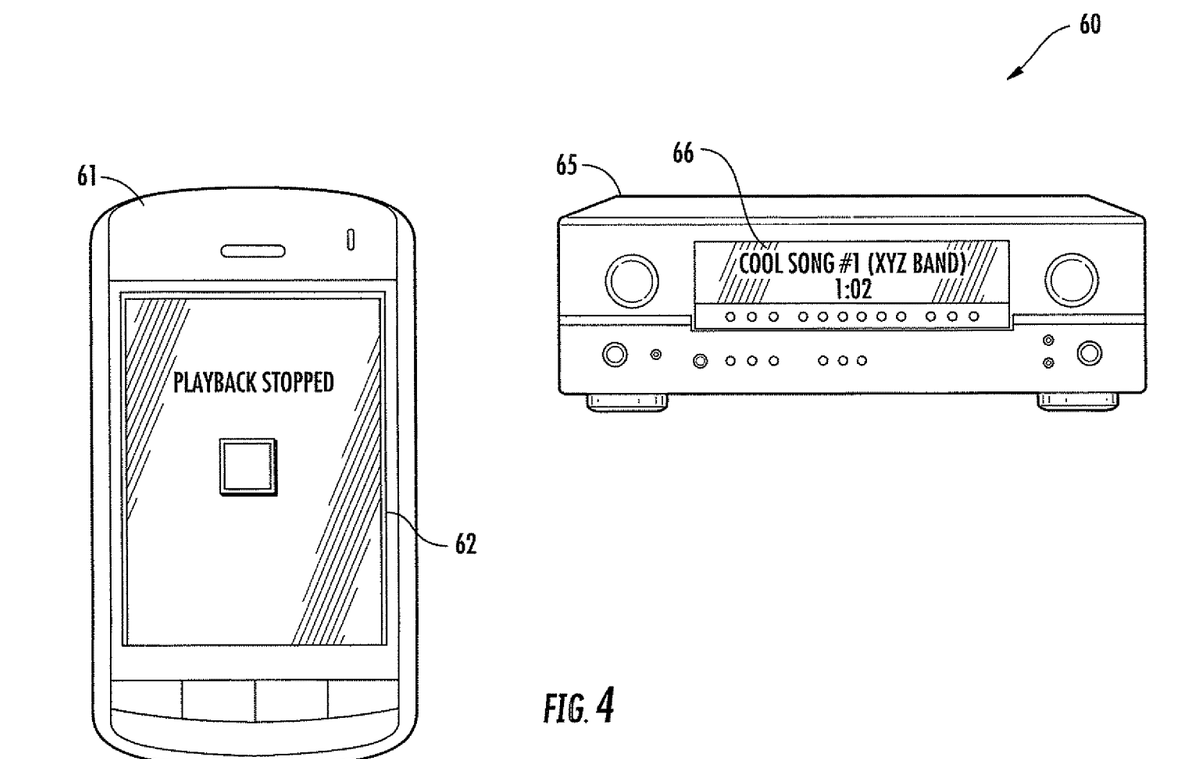

Upon receipt of the playback pointer, the stereo receiver 65 accesses the given media content (i.e., "Cool Song #1") from a media content database, network, etc., and begins playback, and picking up from the point where the mobile device 61 was in playback. That is, the stereo receiver 65 advantageously begins playback at 1:02 into the song, as shown on the display 66. Depending on the given implementation, playback does not have to continue at the same point in time. For example, in one embodiment, a buffer may be added in to begin playback on the stereo receiver 65 several seconds before or after the last point of playback on the mobile device 61. Alternatively, in one embodiment, the given media content may be restarted from the beginning, or playback may commence on a subsequent track, chapter, etc., in some embodiments, for example. Another parameter that may be passed between the mobile device 61 and the stereo receiver 65 is a startup delay. In this way, the mobile device 61 may advantageously continue to play the song, etc., for x number of seconds while the stereo receiver 65 has time to power up (if necessary), retrieve the media file, and begin playback. This may advantageously help ensure that the mobile device 61 stops playback at substantially the same instance that the stereo receiver 65 begins playback.

Furthermore, as seen on the display 65 of the mobile device 61, upon communicating the playback pointer to the stereo receiver 65, the mobile device discontinues or stops playback of the song. In some example embodiments, the mobile device 61 may advantageously be configured to then operate as a remote control for the stereo receiver 65, to provide further convenience in managing playback by the stereo receiver 65.

In addition to the electronic devices described above, various other types of electronic devices may also be used. By way of example, such devices may include portable or personal media players (e.g., music or MP3 players, video players, etc.), portable gaming devices, portable or mobile telephones, smartphones, tablet computers, electronic readers ("e-readers"), car audio or video devices, etc.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
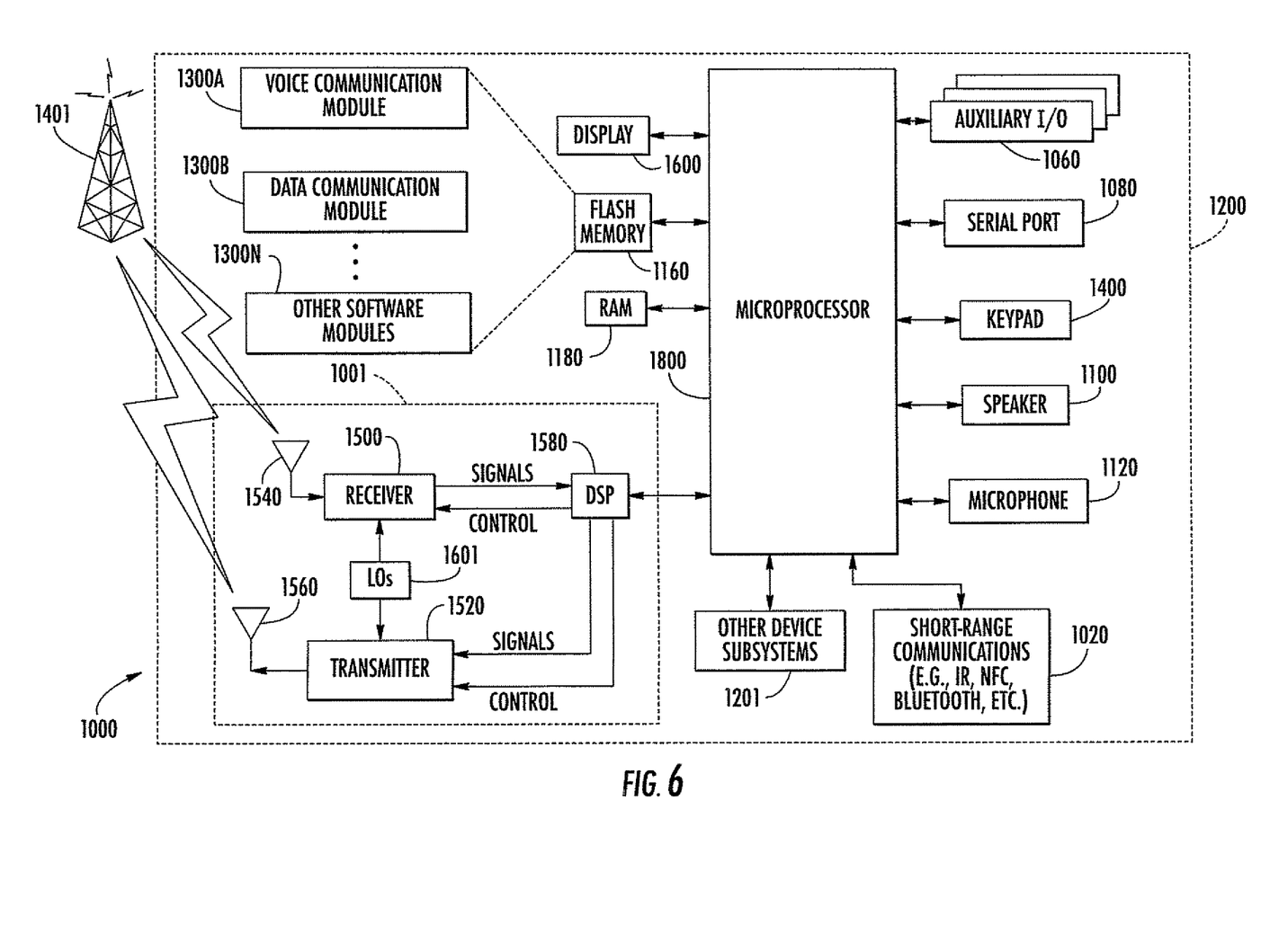
FIG. 6 is a schematic block diagram illustrating example components of a mobile wireless communications device that may be used with the systems of FIGS. 1 through 4.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
 a first electronic device comprising
  a first media content playback device, a first wireless transceiver, and a first controller coupled with said first media content playback device and said first wireless transceiver; and a second electronic device comprising
 a second media content playback device, a second wireless transceiver configured to wirelessly communicate with said first wireless transceiver, and
 a second controller coupled with said second media content playback device and said second wireless transceiver; said first controller being configured to generate a playback pointer associated with playback of given media content being played by said first media content playback device from a first media content source, and wirelessly communicate the playback pointer to said second controller;
 said second controller being configured to continue playback the given media content from a second media content source different than the first media content source based upon the playback pointer and without receiving the given media content from said first electronic device;
 wherein said first and second wireless transceivers are configured to communicate with one another when in proximity with one another.

2. The wireless communications system of claim 1 wherein said first and second wireless transceivers comprise near field communication (NFC) transceivers.

3. The wireless communications system of claim 1 wherein the playback pointer comprises a media content identifier.

4. The wireless communications system of claim 1 wherein said second controller is configured to obtain media content from the second media content source via a communications network and based upon a network address; and
 wherein the playback pointer further comprises a network address for the given media content.

5. The wireless communications system of claim 1 wherein said first controller is further configured to discontinue playback of the given media content upon wirelessly communicating the playback pointer to said second controller.

6. The wireless communications system of claim 1 wherein said first electronic device comprises a mobile wireless communications device.

7. The wireless communications system of claim 1 wherein said second electronic device comprises a media content server.

8. The wireless communications system of claim 1 wherein the given media content comprises at least one of an audio content or a video content.

9. An electronic device comprising:
a media content playback device;
a wireless transceiver configured to wirelessly communicate with a wireless communications device; and
a controller coupled with said media content playback device and wireless transceiver, said controller being configured to
receive a playback pointer from the wireless communications device via said wireless transceiver, the playback pointer being associated with playback of a given media content being played by the wireless communications device from a first media content source, and
continue play back the given media content with the media content playback device from a second media content source different than the first media content source based upon the playback pointer and without receiving the given media content from the wireless communications device;
wherein said wireless transceiver is configured to communicate with the wireless communications device when in proximity thereto.

10. The electronic device of claim 9 wherein said wireless transceiver comprises a near field communication (NFC) transceiver.

11. The electronic device of claim 9 wherein the playback pointer comprises a media content identifier.

12. The electronic device of claim 9 wherein said controller is configured to obtain media content from the second media content source via a communications network and based upon a network address; and
wherein the playback pointer further comprises a network address for the given media content.

13. A non-transitory computer- readable medium having computer-executable instructions for causing an electronic device comprising a media content playback device and a wireless transceiver to perform steps comprising:
receiving a playback pointer from a wireless communications device via the wireless transceiver, the playback pointer being associated with playback of given media content being played by the wireless communications device from a first media content source; and
continue playing back the given media content from a second media content source different than the first media content source via the media content playback device based upon the playback pointer and without receiving the given media content from the wireless communications device;
wherein the wireless transceiver is configured to communicate with the wireless communications device when in proximity thereto.

14. The non-transitory computer-readable medium of claim 13 wherein the wireless transceiver comprises a near field communication (NFC) transceiver.

15. The non-transitory computer-readable medium of claim 13 wherein the playback pointer comprises a media content identifier.

16. The non-transitory computer-readable medium of claim 13 wherein the playback pointer further comprises a network address for the given media content; and
further having computer-executable instructions for causing the electronic device to perform a step comprising obtaining media content from the second media content source via a communications network and based upon the network address.

17. A method for using an electronic device comprising a media content playback device and a wireless transceiver, the method comprising:
receiving a playback pointer from a wireless communications device via the wireless transceiver, the playback pointer being associated with playback of given media content being played by the wireless communications device from a first media content source; and continue playing back the given media content from a second media content source different than the first media content source via the media content playback device based upon the playback pointer and without receiving the given media content from the wireless communications device;
wherein the wireless transceiver is configured to communicate with the wireless communications device when in proximity thereto.

18. The method of claim 17 wherein the wireless transceiver comprises a near field communication (NEC) transceiver.

19. The method of claim 17 wherein the playback pointer comprises a media content identifier.

20. The method of claim 17 wherein the playback pointer further comprises a network address for the given media content; and further having computer-executable instructions for causing the electronic device to perform a step comprising obtaining media content from the second media content source via a communications network and based upon the network address.

* * * * *